June 16, 1959 — L. D. SOUBIER — 2,890,483
MACHINE FOR FORMING PLASTIC CONTAINERS
Filed July 1, 1955 — 4 Sheets-Sheet 1
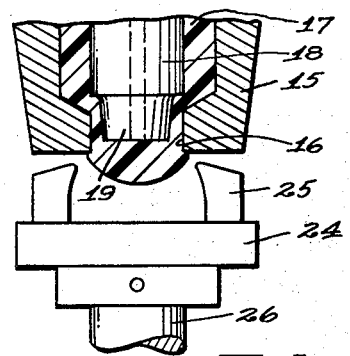
Fig-1-
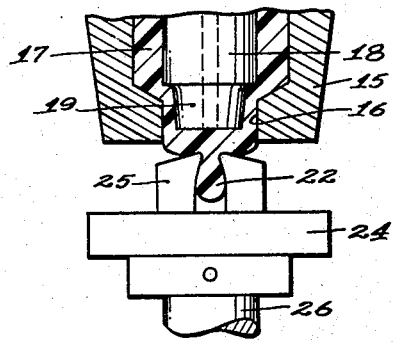
Fig-2-
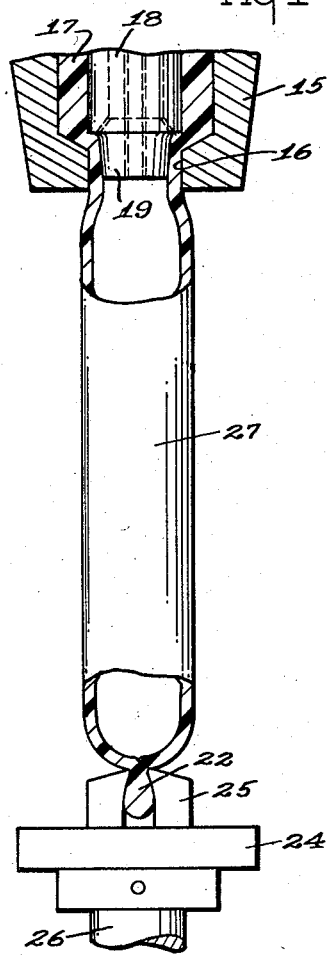
Fig-3-
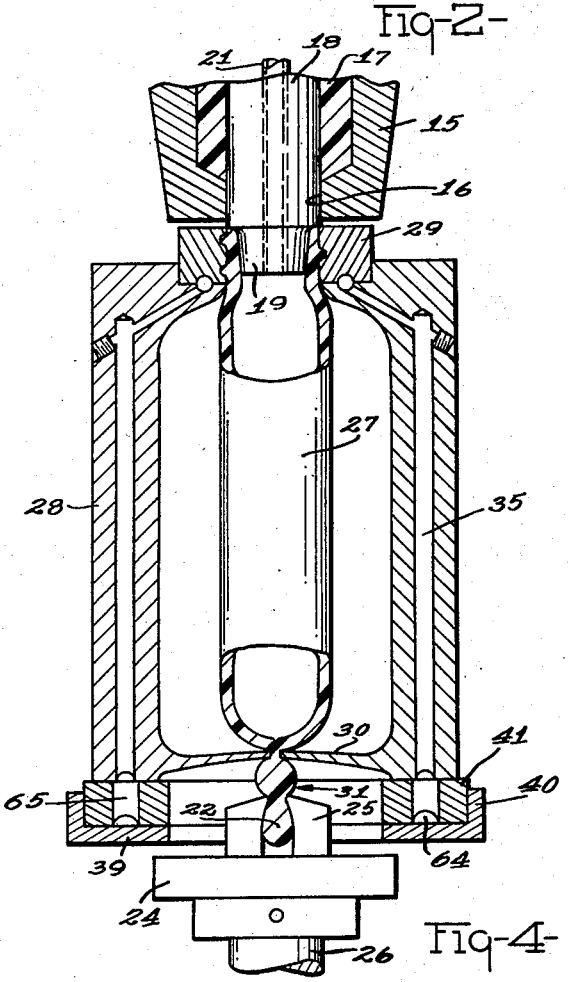
Fig-4-
INVENTOR
L.D. SOUBIER
BY Rule and Hoge

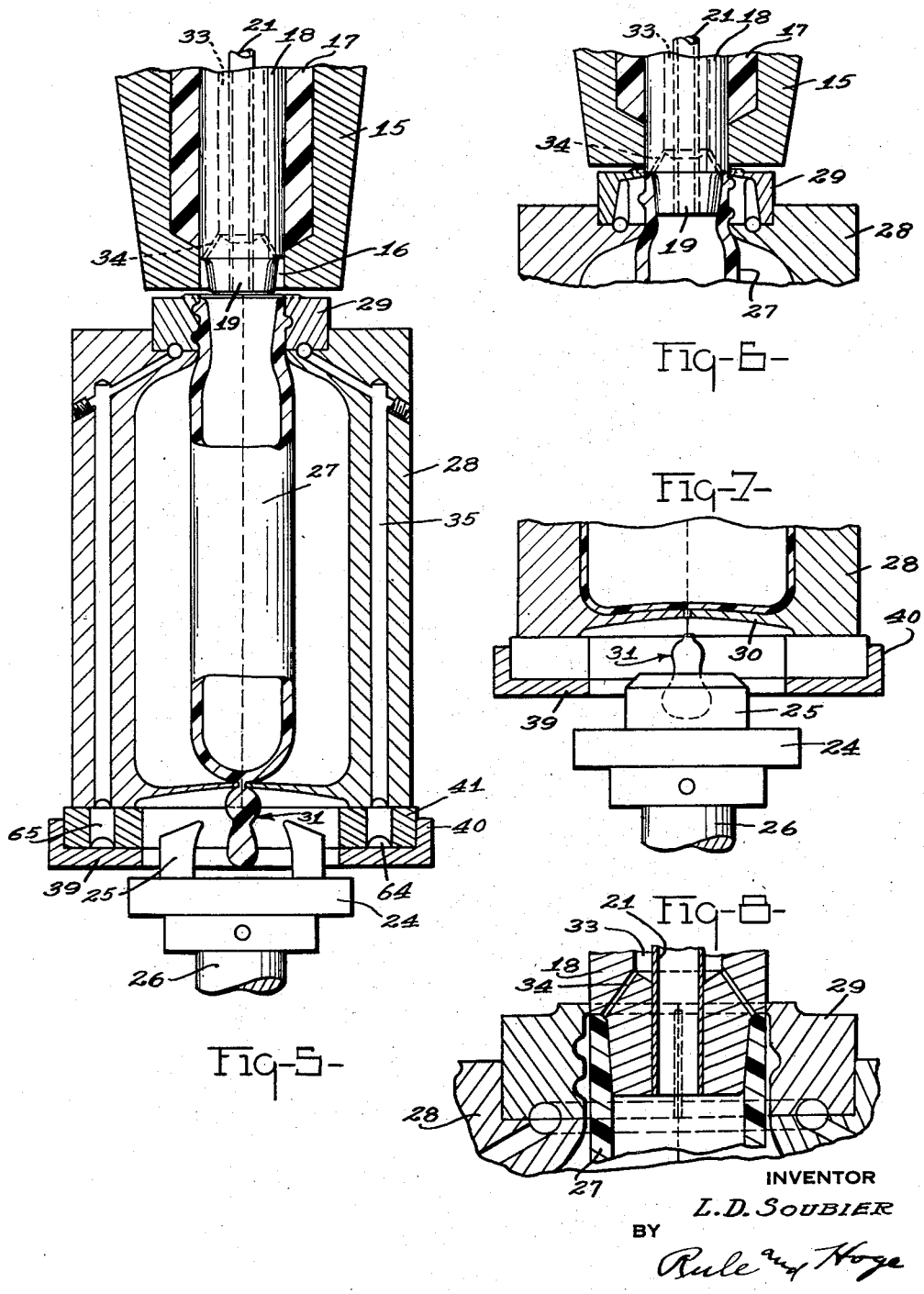

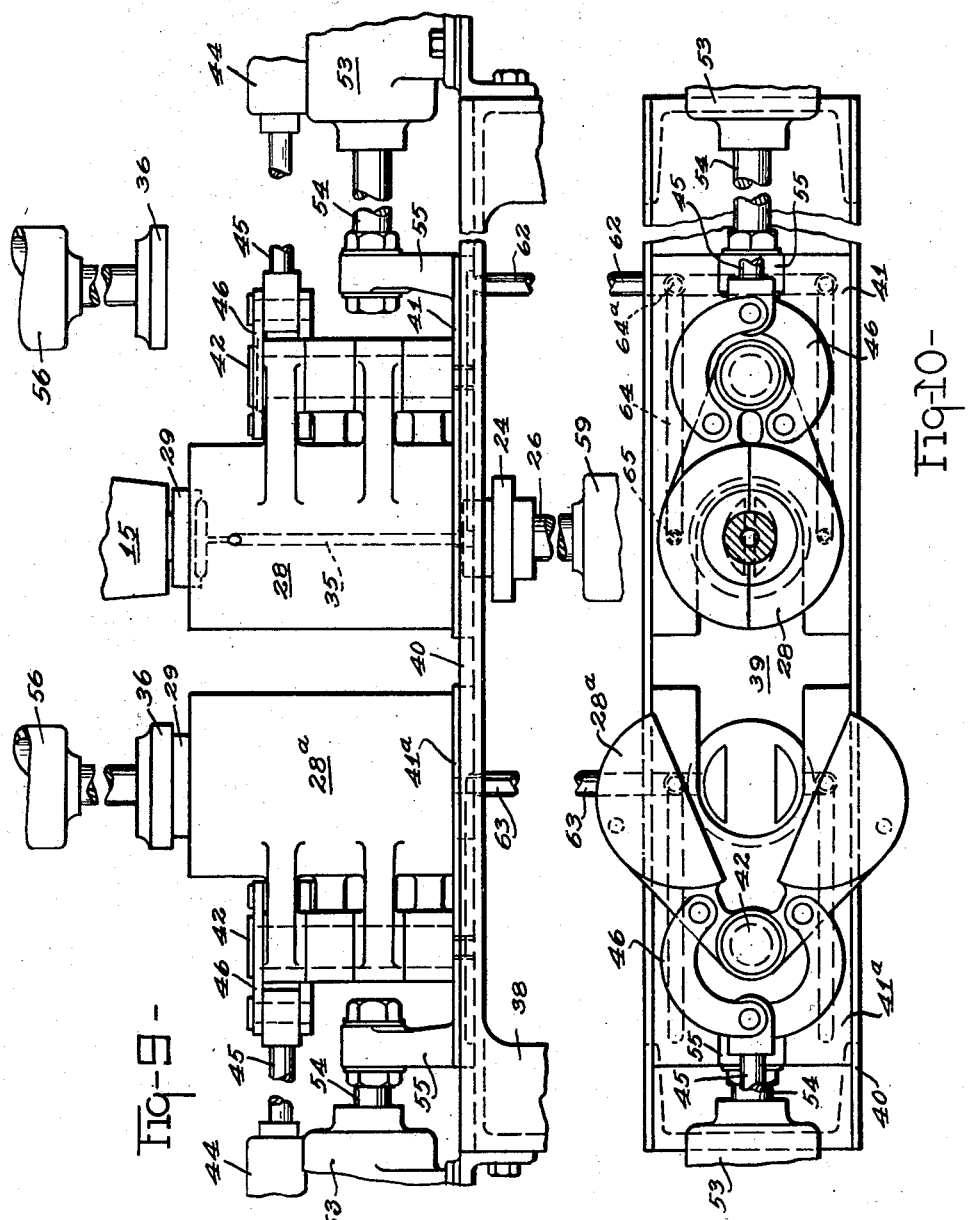

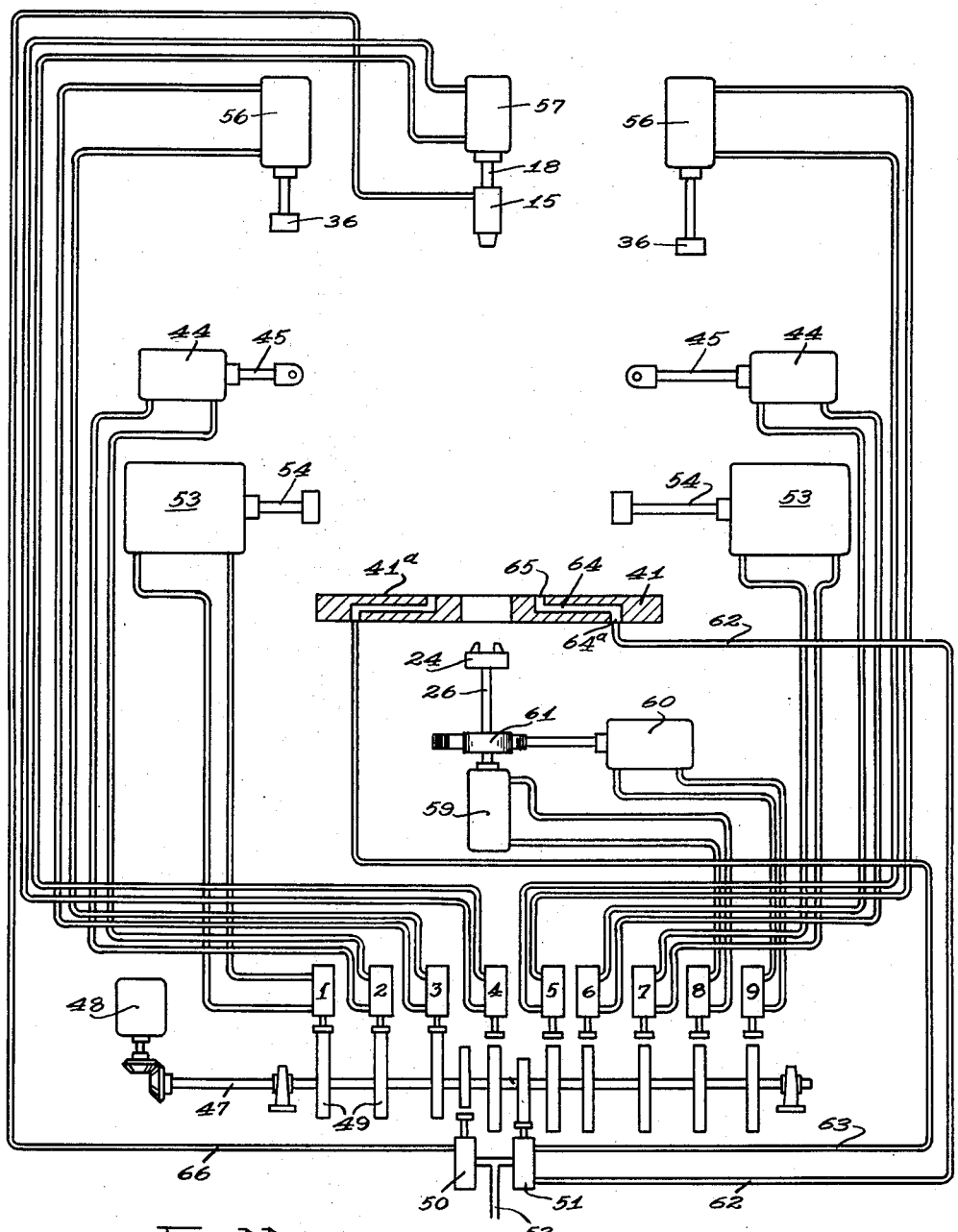

United States Patent Office 2,890,483
Patented June 16, 1959

2,890,483

MACHINE FOR FORMING PLASTIC CONTAINERS

Leonard D. Soubier, Toledo, Ohio, assignor to Owens-Illinois Glass Company, a corporation of Ohio Application July 1, 1955, Serial No. 519,548

11 Claims. (Cl. 18—5)

My invention relates to the art of forming hollow articles of plastic material. The invention may be used for making bottles, jars and various other articles by a combined extrusion and molding method. The invention in the preferred form herein illustrated is particularly adapted for the manufacture of bottles and other containers. As illustrated the invention provides an extruder through which the plastic material is extruded downwardly through a bottom outlet orifice combined with a plunger projecting downward into the orifice and forming therewith an extrusion die with an annular discharge orifice. A gripping device beneath the extruder grasps the issuing plastic material and is moved downwardly while the material is extruded through the annular orifice to form a tubular body.

Combined with the extrusion mechanism is a molding machine or apparatus comprising a pair of finishing molds mounted below the extruder for horizontal reciprocating movement by which the molds are brought in alternation beneath and into register with the extruder. Each finishing mold includes a partible body blank mold and a neck mold combined therewith and which is brought into register with the extrusion die and closed around the tubular blank. The plunger is then lowered and enters the neck mold which surrounds the upper end portion of the blank and forms an inner wall of the neck mold cavity. The lowering of the plunger severs the blank from the supply body. Suction is applied at the upper end of the blank to support the blank when severed from the supply body. The plunger is then withdrawn, the finishing mold moved laterally and a blow head lowered on to the neck mold and the blank blown to its final form within the mold. When the finishing mold is closed, suction is applied within the neck mold cavity to complete the formation of the neck. When one finishing mold with the blank therein is withdrawn the other finishing mold is moved forward beneath the extruder and the cycle of forming operations is repeated.

Piston motors, herein referred to as cylinders, under the control of a timer mechanism are used for effecting the various mechanical operations automatically in the required sequence as hereinafter set forth.

Referring to the accompanying drawings which illustrate a preferred form of the invention:

Fig. 1 is a fragmentary part sectional elevation of the extruder and gripper and showing the plastic material at the commencement of the extrusion;

Fig. 2 is a similar view showing the gripping jaws operated to grip the end portion of the extruded plastic;

Fig. 3 is a view similar to Fig. 2 showing the gripper lowered and the plastic extruded in tubular form;

Fig. 4 illustrates a further step in the operation, showing the combined neck and finishing molds enclosing the tubular body and the neck plunger lowered to sever the extruded blank from the supply body;

Fig. 5, similar to Fig. 4, shows the neck plunger withdrawn and the gripping jaws opened, leaving the blank enclosed within the finishing mold;

Fig. 6 is a fragmentary view showing particularly portions of a suction line extending to the neck mold;

Fig. 7 is a fragmentary view showing the lower end portion of a finishing mold and indicating the rotation of the gripper for twisting off the moil from the molded article;

Fig. 8 is a view on a somewhat larger scale showing the neck mold and air and vacuum lines extending through the plunger;

Fig. 9 is a partly diagrammatic elevational view of the molding machine, parts being broken away;

Fig. 10 is a plan view of the same; and

Fig. 11 is a piping diagram showing the air cylinders, the air and vacuum lines and the timer mechanism.

Referring to Fig. 1 the extruder 15 is formed with a bottom outlet orifice 16 through which the plastic material 17 is extruded downwardly. A plunger 18 mounted for vertical reciprocation within the extruder comprises a lower end portion 19 in the form of a plug which extends downward within the orifice 16 and together with the extruder forms an extrusion die with an annular outlet orifice through which the material 17 is extruded downwardly in the form of a tube 27. An air pipe 21 extends downward through the plunger 18 and supplies air under sufficient pressure to prevent collapsing of the tube or to expand it to any desired extent. The plug 19 when lowered enters the neck mold as hereinafter described and forms therewith the neck mold cavity.

A gripper 24 comprising gripping jaws 25 is mounted on a stem 26 in vertical alignment with the extruder 15. The gripper is movable up and down and also rotatable about its axis as presently described. The gripper is shown in its upper position in Fig. 1 with the jaws open. When the jaws are closed they grip the lower end portion 22 of the issuing plastic (Fig. 2). This end portion, in the form of a knob, provides a bottom end closure for the tubular mass formed within the extrusion die. The plunger 18 at this time is in its lifted position. The gripper moves downward while the plastic is extruded under pressure applied within the extruder so that a blank of plastic material is extruded in the form of a tube 27. After the tube is thus formed the plunger 18 is moved downwardly through the extruder outlet orifice thereby severing the tube 27 from the supply body. A finishing mold comprising a body blow mold 28 and neck mold 29 then closes around the tube 27. The mold 28 is formed with a mold bottom 30 which when the mold is closed, squeezes and closes the lower end portion of the tube 27. The gripper 24 is then rotated about its axis as hereinafter described to twist and sever the moil 31.

When the plunger 18 is lowered to sever the charge of plastic material suction is applied at the upper end of the extruded tube 27 to hold it temporarily on the plunger. The suction line leading to the neck mold includes a tubular channel 33 (Figs. 6 and 8) surrounding the air pipe 21 and extended through branch channels 34 to the upper end of the neck mold cavity. Suction through this line serves to hold the tube 27 on the plunger when severed from the supply body.

The formation of the neck portion of the article is completed by suction applied to the neck mold through a vacuum line which includes channels 35 extending upward through the side walls of the blow molds 28 and 28ª.

When the plunger 18 has been withdrawn upwardly to clear the neck mold 29, as shown in Fig. 5, the combined blow mold and neck mold are moved laterally to bring them beneath and in vertical alignment with a blow head 36 which is then moved downward to seat on the neck mold. Air under pressure is then supplied through the blow head and blows the parison or tube 27 to its final form in the finishing mold. The mold then opens to discharge the molded article.

Referring to Figs. 9 and 10, the machine frame 38 includes a horizontal platform 39 extending lengthwise of the machine and formed with marginal flanges 40 providing a guideway for the mold carriages. Two mold carriages 41 and 41a are mounted for horizontal reciprocating movement to bring the two blow molds 28 and 28a alternately beneath and in register with the extruder 15. Each blow mold comprises partible halves pivoted to swing about a vertical pivot post 42. The molds 28 and 28a are opened and closed by air motors 44 individual to the molds. Operating connections between each cylinder 44 and the mold include a piston rod 45 and links 46 connecting the piston rod to the mold arms.

The cylinders 44 and the various other cylinders or piston motors for operating the moving parts of the machine are powered by air under pressure supplied under the control of a timer mechanism, shown diagrammatically in Fig. 11. The timer includes a timer shaft 47 driven continuously by a motor 48. Cams 49 on the timer shaft operate valves individual to the respective cylinders. These valves are numbered from 1 to 9 inclusive. The timer also includes cams for operating valves 50 and 51 which control the application of suction to the vacuum lines. The suction is applied through a pipe 52 connected to any suitable air exhausting means.

Each of the mold carriages 41 and 41a is reciprocated by a cylinder 53 connected through a piston rod 54 with a standard 55 on the carriage. The blow heads 36 are operated by cylinders 56 individual thereto. The plunger 18 is moved up and down by a cylinder 57. The gripper 24 is reciprocated vertically by a cylinder 59. The gripper is rotated about its axis by a cylinder 60 for twisting off the moil as heretofore described. The piston rod of the cylinder 60 has a rack and pinion driving connection 61 with the gripper shaft 26. The cylinders 53 are under the control of valves 1 and 7 respectively. The cylinders 44 for opening and closing the blow molds are under the control of the valves 2 and 6 respectively. The blow head cylinders 56 are under the control of the valves 3 and 5 respectively. The plunger cylinder 57 is under the control of the valve 4. The valves 8 and 9 control the operation of the cylinders 59 and 60 respectively.

The valve 51 controls the application of suction to vacuum lines comprising pipes 62 and 63 which extend to the carriages 41 and 41a on which the blow molds 28 and 28a are mounted.

When a mold carriage, for example, carriage 41 is moved forward to position the blow mold 28 beneath the extruder 15, a port 64a of a channel 64 in the mold carriage is brought into register with the vacuum pipe 62. The channel 64 opens upwardly through a port 65 (Figs. 5, 10, and 11). When the mold 28 closes, the port 65 is brought into register with the vacuum channel 35 in the mold which as above described communicates with the neck mold cavity. The valve 51 operates to open the vacuum line to the vacuum supply line 52 so that the neck mold is vacuumized to complete the formation of the molded neck. The valve 50 is operated to open the suction line 52 to the vacuum pipe 66 which extends to the extruder 15 and opens into the channel 33 within the plunger.

A cycle of operations includes the following steps which may be in the following sequence. At the commencement of the formation of a blank the plunger 18 has been withdrawn to its upper position (Fig. 1). The gripping jaws 25 grip the protruding end of the plastic material (Fig. 2). The gripping head 24 is then moved downward by its cylinder 59 while the plastic is being extruded, thus forming the tubular blank 27. The mold carriage 41 is now moved forward by the cylinder 53, bringing the open mold 28 beneath the extruder. The cylinder 44 then closes the combined blow mold and neck mold. The plunger 18 is then lowered by its cylinder 57 thus severing the extruded blank from the supply body and positioning the neck mold core 19 within the neck mold (Fig. 4). The valve 50 is operated as the plunger is lowered to open the vacuum lines 66, 33, 34, extending to the upper end of the neck mold cavity thereby temporarily supporting the severed blank. The cylinder 57 then withdraws the plunger upwardly to clear the neck mold 29. The cylinder 53 withdraws the finishing mold with the blank therein to the blow mold station and registers the mold with the blow head 36. The cylinder 56 lowers the blow head and the blank is then blown to its finished form.

After the blow mold closes around the blank the gripping jaws are closed on the protruding moil 31 and the gripper rotated by the cylinder 60 to twist off the moil. When the plunger 18 is moved upward to clear the finishing mold the extrusion of the plastic for forming the next succeeding blank commences immediately and the cycle of operations is repeated, the blow mold 28a being brought into blank receiving position concurrently with the forming operations taking place within the mold 28.

Modifications may be resorted to within the spirit and scope of my invention.

I claim:

1. Apparatus for forming hollow articles of plastic material comprising an extrusion die having a tubular channel terminating in an annular bottom outlet orifice through which the material in plastic form is extruded and beneath which the material accumulates in the open in the form of a knob forming a bottom end closure for the tubular mass in said channel, a gripper comprising gripping jaws relatively movable toward each other from an open position to a gripping position, means for supporting the gripper with the jaws open and out of position to contact the plastic material during the formation of said knob, means for then operating the gripper and moving the gripping jaws to gripping position and thereby gripping said knob, means for drawing the gripper away from the extrusion die as the plastic is extruded and thereby forming a tubular blank, means for supplying air within the blank as the latter is formed for preventing its collapse and maintaining said tubular form, a partible finishing mold including a body blank mold and a neck mold, means for closing the finishing mold around the tubular blank while the blank is suspended from the extrusion die, with the finishing mold between the gripper and extrusion die and with the neck mold between the body blank mold and extrusion die, and means for expanding the blank within the mold.

2. The apparatus defined in claim 1, said die including a plunger, and means for moving the plunger relative to the neck mold into position to mold the inner surface of the neck portion of the article, said plunger shaped to sever the blank from the supply body during said movement.

3. Apparatus for forming hollow articles of plastic material, said apparatus comprising an extruder having a bottom outlet opening, a plunger mounted within the extruder and projecting downwardly within said opening and forming with said opening an annular outlet orifice, a gripper movable vertically toward and from said orifice, said gripper comprising means for gripping a portion of the plastic protruding below the orifice, means for moving the gripper downwardly concurrently with extrusion of plastic material through said orifice and thereby forming a tubular blank, means for supplying air within the blank during its formation and thereby maintaining its tubular form, a partible finishing mold, means for closing the mold around the blank while the gripper is in its lowered position, with the finishing mold between the gripper and the said outlet orifice, the finishing mold comprising a body mold and a neck mold at the upper end of the body mold and having a neck mold opening in register with the said bottom outlet opening of the extruder, the said gripper and neck mold being at opposite ends of the body mold when the finishing mold is closed around the blank, and means for blowing the blank within the mold.

4. The apparatus defined in claim 3 including means for moving the plunger downwardly and positioning the lower end portion of the plunger within the neck of the mold, said plunger shaped to close the outlet orifice and sever the blank from the supply body as the plunger is lowered.

5. The apparatus defined in claim 4, the plunger being shaped to mold the inner wall surface of the neck of said article and forming with the neck mold a neck mold cavity, and means for applying suction to the upper end of the blank when the plunger is lowered.

6. The apparatus defined in claim 3, the mold comprising bottom sections brought together by the closing of the mold and operable to close the lower end of the tubular blank as the mold is closed, leaving a moil protruding below the mold bottom and in the grip of said gripping device, and means for rotating the gripping device and thereby severing the moil.

7. Apparatus for forming hollow articles of plastic material, said apparatus including an extruder having a bottom outlet opening, a plunger within the extruder and projecting downwardly into said opening and forming therewith an annular outlet orifice through which the plastic is extruded in tubular form, a finishing mold comprising a combined body mold and neck mold, means for positioning the finishing mold to enclose the extruded tubular blank, means for lowering the plunger and positioning the lower end portion thereof within the mold, said plunger shaped to shear the extruded blank from the supply body when the plunger is lowered, a suction line extending to the upper end of the severed blank, said line including a vacuum channel extending through the plunger, and means for exhausting the air through said channel when the plunger is lowered.

8. The apparatus defined in claim 7, said plunger having a tubular passageway therethrough through which air is supplied during the formation of the tubular blank for maintaining its tubular form.

9. Apparatus for forming hollow articles of plastic material comprising an extrusion die having an annular bottom outlet orifice through which the material in plastic form is extruded, a gripper, means for operating the gripper and thereby gripping the end portion of the issuing plastic, means for drawing the gripper away from the extrusion die as the plastic is extruded and thereby forming a tubular blank, means for supplying air within the bank as the latter is formed for preventing its collapse and maintaining said tubular form, a particle finishing mold including a body blank mold and a neck mold, means for closing the finishing mold around the tubular blank, and means for expanding the blank within the mold, said die including a plunger, and means for moving the plunger relative to the neck mold into position to mold the inner surface of the neck portion of the article, said plunger shaped to sever the blank from the supply body during said movement.

10. Apparatus for forming hollow articles of plastic material, said apparatus comprising an extruder having a bottom outlet opening, a plunger mounted within the extruder and projecting downward within said opening and forming with said opening an annular outlet orifice, a gripper movable vertically toward and from said orifice, said gripper comprising means for gripping a portion of the plastic protruding below the orifice, means for moving the gripper downwardly concurrently with extrusion of plastic material through said orifice and thereby forming a tubular blank, means for supplying air within the blank during its formation and thereby maintaining its tubular form, a partible finishing mold, means for closing the finishing mold around the blank, means for moving the plunger downwardly and positioning the lower end of the plunger within the neck of the mold, said plunger shaped to close the outlet orifice and sever the blank from the supply body as the plunger is lowered, the plunger being shaped to mold the inner wall surface of the neck of said article and forming with the neck mold a neck mold cavity, means for applying suction to the upper end of the blank when the plunger is lowered, and means for blowing the blank within the finishing mold.

11. Apparatus for forming hollow articles of plastic material, said apparatus comprising an extruder having a bottom outlet opening, a plunger mounted within the extruder and projecting downwardly within said opening and forming with said opening an annular outlet orifice, a gripper movable vertically toward and from said orifice, said gripper comprising means for gripping a portion of the plastic protruding below the orifice, means for moving the gripper downwardly concurrently with extrusion of plastic material through said orifice and thereby forming a tubular blank, means for supplying air within the blank during its formation and thereby maintaining its tubular form, a partible finishing mold, means for closing the mold around the blank, and means for blowing the blank within the mold, the mold comprising bottom sections brought together by the closing of the mold and operable to close the lower end of the tubular blank as the mold is closed, leaving a moil protruding below the mold bottom and in the grip of said gripping device, and means for rotating the gripping device and thereby severing the moil.

References Cited in the file of this patent

UNITED STATES PATENTS

| | | |
|---|---|---|
| 2,175,054 | Ferngren et al. | Oct. 3, 1939 |
| 2,262,612 | Kopitke | Nov. 11, 1941 |
| 2,288,454 | Hobson | June 30, 1942 |
| 2,353,825 | Hoffman | July 18, 1944 |
| 2,457,687 | Kopitke | Dec. 28, 1948 |
| 2,515,093 | Mills | July 11, 1950 |
| 2,552,458 | Reiskind et al. | May 8, 1951 |
| 2,622,275 | Dodge | Dec. 23, 1952 |
| 2,632,202 | Haines | Mar. 24, 1953 |
| 2,674,006 | Bailey et al. | Apr. 6, 1954 |
| 2,710,987 | Sherman | June 21, 1955 |

FOREIGN PATENTS

| | | |
|---|---|---|
| 1,091,090 | France | Apr. 6, 1955 |
| 695,611 | Great Britain | Aug. 12, 1953 |